US012762896B2

(12) United States Patent
Hamilton

(10) Patent No.: US 12,762,896 B2
(45) Date of Patent: Oct. 13, 2026

(54) SYSTEM AND METHOD FOR AUTOMATED AND FEEDBACK BASED HUMAN MOVEMENT GUIDANCE

(71) Applicant: Mark Hamilton, Dubai (AE)

(72) Inventor: Mark Hamilton, Dubai (AE)

( * ) Notice: Subject to any disclaimer, the term of this patent is extended or adjusted under 35 U.S.C. 154(b) by 273 days.

(21) Appl. No.: 18/659,024

(22) Filed: May 9, 2024

(65) Prior Publication Data

US 2025/0349154 A1 Nov. 13, 2025

(51) Int. Cl.

*G06V 40/20* (2022.01)
*G06T 13/40* (2011.01)
*G06T 15/00* (2011.01)
*G06V 40/16* (2022.01)

(52) U.S. Cl.

CPC .............. *G06V 40/23* (2022.01); *G06T 13/40* (2013.01); *G06T 15/005* (2013.01); *G06V 40/174* (2022.01)

(58) Field of Classification Search

CPC ...... G06V 40/23; G06V 40/174; G06T 13/40; G06T 15/005

See application file for complete search history.

(56) References Cited

U.S. PATENT DOCUMENTS 9,669,315 B1 * 6/2017 Curtis .................... A63F 13/798
2019/0251397 A1 * 8/2019 Tremblay ................ G06T 15/00
2020/0105041 A1 * 4/2020 Garofalo ................. G06T 13/40

* cited by examiner

*Primary Examiner* — Jianxun Yang
(74) *Attorney, Agent, or Firm* — Sam Pierce

(57) ABSTRACT

The present invention relates to a motion capture and analysis method and system that provides automated, personalized feedback to users performing physical movements. The invention allows movement experience leaders to create hyper-realistic digital avatars of themselves, which guide users through specific movements and analyze their performance in real-time using advanced motion capture and AI techniques. By leveraging state-of-the-art game engines, neural networks, and 3D motion capture data, the system enables a highly immersive and interactive learning experience that closely mimics human-to-human instruction. The invention aims to provide a scalable platform for experts to deliver personalized training to a wide audience, with potential applications in virtual fitness classes, dance lessons, and sports coaching.

7 Claims, 6 Drawing Sheets

SYSTEM AND METHOD FOR AUTOMATED AND FEEDBACK BASED HUMAN MOVEMENT GUIDANCE

BACKGROUND

The present invention relates generally to the field of motion capture and analysis systems, and more specifically to a feedback control method and system that utilizes motion capture data to provide automated, personalized feedback and instruction to users performing physical movements.

Motion capture and analysis technologies have seen significant advancements in recent years, enabling their application across various domains such as entertainment, sports training, and physical therapy. These systems typically involve tracking the movements of a subject using markers or sensors, and then analyzing the captured data to provide insights or generate realistic animations.

Several prior art solutions have explored the use of motion capture for feedback and control purposes. For instance, U.S. Pat. No. 7,643,893 discloses a system that employs motion capture to control a device in a closed-loop manner. The system compares the expected motion of the device based on a command signal with the actual motion captured by the motion capture system, and transmits control signals to the device based on this comparison.

Another relevant prior art is described in WO2015116675A1, which presents a portable system for providing immediate feedback and corrective instructions to users performing specific motions. The system captures motion data from sensors, transfers it to a mobile computing device for analysis, and delivers feedback to the user. It aims to offer a closed-loop solution that eliminates the need for manual expert review.

However, the existing solutions have certain limitations when it comes to scaling personalized training experiences delivered by expert instructors. They often lack the ability to create realistic digital avatars of the instructors that can accurately demonstrate and assess complex movements. Moreover, the feedback provided by these systems may not be sufficiently granular or tailored to the user's specific performance.

The present invention addresses these shortcomings by introducing a novel system that allows movement experience leaders to create hyper-realistic digital replicas of themselves. These avatars can guide users through specific movements, analyze their performance in real-time and provide automated, personalized feedback. The invention thus represents a significant advancement over the prior art, offering a scalable platform for experts to deliver personalized training to a wide audience.

SUMMARY

The present invention relates to a novel closed-loop motion capture and analysis system that enables movement experience leaders to create hyper-realistic digital avatars of themselves for delivering personalized, automated feedback and instruction to users performing physical movements.

In one embodiment, the invention comprises a process for creating digital replicas of instructors using advanced motion capture techniques and importing the captured data into a state-of-the-art game engine environment. The system then preprocesses the instructor's movements to generate AI predictions from various angles and conditions, which are later used to provide more human-like feedback to the user.

During operation, the user's movements are captured using a camera feed and compared against the instructor's pre-recorded motion data within the game engine. A neural network analyzes the user's performance in real-time, identifying any deviations from the instructor's movements. The system then generates automated feedback and instructions, delivered through the digital avatar, to help the user correct their form and synchronize their movements with the instructor.

The invention leverages a combination of cutting-edge technologies, including 3D motion capture, game engines, and AI-driven analysis, to provide an immersive and interactive learning experience. By utilizing 3D motion capture data as a reference, the system can accurately assess the user's movements from any angle, ensuring a comprehensive evaluation of their performance. The integration of multiple neural network models within the game engine allows for flexible and efficient analysis of user movements. The system can dynamically select the most appropriate model for each specific movement or exercise, optimizing the accuracy and speed of the feedback process.

Potential applications of the invention include virtual fitness classes, dance lessons, sports coaching, and physical therapy sessions. By enabling renowned instructors to create digital replicas of themselves, the system provides users with access to high-quality, personalized training experiences that would otherwise be limited by geographical constraints or the instructor's availability.

In summary, the present invention represents a significant advancement in the field of motion capture and analysis, offering a scalable, immersive, and highly personalized platform for delivering automated feedback and instruction. By leveraging state-of-the-art technologies and closely mimicking human-to-human interaction, the system has the potential to revolutionize various industries and empower users to learn and improve their physical skills more effectively.

BRIEF DESCRIPTION OF THE DRAWINGS

The various exemplary embodiments of the present invention. which will become more apparent as the description proceeds, are described in the following detailed description in conjunction with the accompanying drawings, in which.

DETAILED DESCRIPTION

Figure 1:
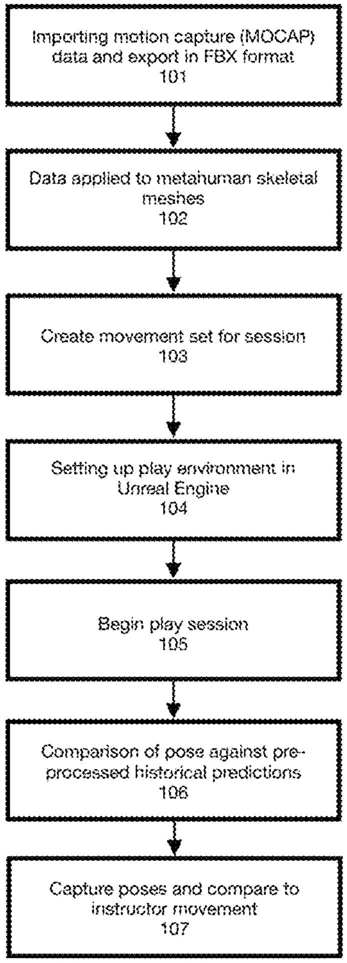
FIG. 1 is a flow diagram illustrating a method for providing automated feedback on user movements compared to pre-recorded instructor movements.

In the following detailed description of the preferred embodiments, reference is made to the accompanying drawings, which form a part hereof and show, by way of illustration, specific embodiments in which the invention may be practiced. It is to be understood that other embodiments may be used and structural or logical changes may be made without departing from the scope of the present invention. The following detailed description, therefore, is not to be taken in a limiting sense, and the scope of the present invention is defined by the appended claims.

The following description is provided as an enabling teaching of the present systems, and/or methods in its best, currently known aspect. To this end, those skilled in the relevant art will recognize and appreciate that many changes can be made to the various aspects of the present systems described herein, while still obtaining the beneficial results of the present disclosure. It will also be apparent that some of the desired benefits of the present disclosure can be obtained by selecting some of the features of the present disclosure without utilizing other features.

Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

The terms “a” and “an” and “the” and similar references used in the context of describing a particular embodiment of the present invention (especially in the context of certain claims) are construed to cover both the singular and the plural. The recitation of ranges of values herein is merely intended to serve as a shorthand method of referring individually to each separate value falling within the range. Unless otherwise indicated herein. each individual value is incorporated into the specification as if it were individually recited herein.

All systems described herein can be performed in any suitable order unless otherwise indicated herein or otherwise clearly contradicted by context. The use of any and all examples, or exemplary language (for example, “such as”) provided with respect to certain embodiments herein is intended merely to better illuminate the application and does not pose a limitation on the scope of the application otherwise claimed. No language in the specification should be construed as indicating any non-claimed element essential to the practice of the application. Thus, for example, reference to “an element” can include two or more such elements unless the context indicates otherwise.

As used herein, the terms “optional” or “optionally” mean that the subsequently described event or circumstance can or cannot occur, and that the description includes instances where said event or circumstance occurs and instances where it does not.

The word or as used herein means any one member of a particular list and includes any combination of members of that list. Further, one should note that conditional language, such as, among others, “can,” “could,” “might.” or “may.” unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more aspects or that one or more particular aspects necessarily include logic for deciding, with or without user input or prompting, whether these features, elements and/or steps are included or are to be performed in any particular aspect.

FIG. 1 is a flow diagram illustrating a method for providing automated feedback on user movements compared to pre-recorded instructor movements. In one embodiment of the present invention, the method begins with a pre-requisite step 101, which involves importing motion capture (MOCAP) data from a MOCAP software and exporting it in FBX format. Each movement set is cataloged for further processing.

In step 102, the MOCAP data is imported into Unreal Engine. The FBX files are imported and the motion capture data is applied to Metahuman Skeletal Meshes to create animations. This step prepares the instructor’s movements for use in the automated feedback system.

For each movement set, a session is created in step 103 using the B_CaptureInstructorPoseActor. This actor is configured and run to create recordings for the predictions using a model. The B_PoseNeuralNetwork component is utilized to run the neural network models (native or JavaScript) on the captured frames. The results are multicast and received by the B_PoseParser component, which normalizes the neural network outputs into a specific structure. The inference results, along with the corresponding animation times, are stored as JSON files.

Step 104 involves setting up the play environment in Unreal Engine. The product is prepared to run a comparison from various input sources, such as a camera for capturing a human player, a bot (a dummy duplicate of the instructor or other avatar), or a video source. The B_ComparePoseActor and its components are configured for a specific performance, dance, or exercise session.

In step 105, the play session begins. The instructor avatar starts moving based on the selected session’s animations, and the B_CapturePoseActor initiates an inference cycle using the B_PoseNeuralNetwork component. Frames are captured from the configured input source (camera, bot, or video) and prepared for processing by the neural network model. If using a WebView model, the frame is sent to JavaScript via the Web Bridge, while native models are processed using Unreal Engine’s Neural Network Framework. The B_PoseParser component receives and parses the inference results, which are then multicast to the B_PoseDrawer component for visualization.

Step 106 focuses on pose comparison. The B_ComparePoseActor analyzes and generates comparison results by comparing the current inference against the pre-processed historical predictions of the instructor’s animation at the corresponding time. Various calculations (angles, times, locations, etc.) are performed to determine the result for each key point. Feedback times and positions are determined, and camera data may be collected to show the player’s pose. The B_PoseDrawer component renders the color of the joints based on the comparison results: red for bad position, yellow for warning, and green for coincidence position.

Finally, in step 107, the process of capturing poses, comparing them to the instructor’s movements, and providing feedback is repeated until the session is finished. Feedback is reported to the player based on the comparison results, allowing them to adjust their movements and improve their performance.

Figure 2:
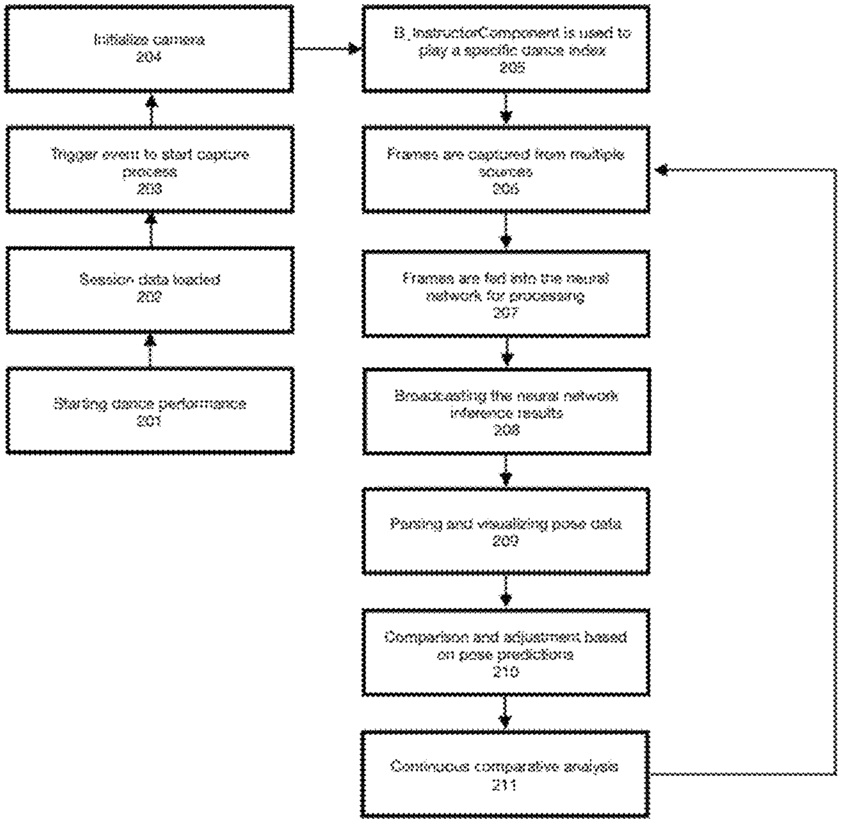
FIG. 2 is a flow diagram illustrating the general process of running a pose estimation.

FIG. 2 is a flow diagram illustrating the general process of running pose estimation. In accordance with one embodiment of the present invention, the process begins with starting the dance performance in step 201, using the B_ComparePoseActor to initiate and manage the comparison of poses during the performance.

In step 202, session data is loaded using the same B_ComparePoseActor. This data likely contains pre-recorded information or parameters necessary for the pose comparison.

Step 203 involves triggering a custom event using B_CapturePoseActor to start capturing poses. This is a crucial step where the system begins collecting real-time data.

The camera is initialized in step 204 by the B_CapturePoseActor to ensure that the capture of dance poses is ready and optimized for the environment and performance.

In step 205, the B_InstructorComponent is used to play a specific dance index, suggesting an interaction where specific sequences or routines are accessed and potentially displayed or analyzed for instructional purposes.

Steps 206 and 207 focus on frame capture and processing. Frames are captured from multiple sources, such as bot scenes, video feeds, or user cameras, and saved as images (e.g., Frame.jpg). The captured frames are then fed into a neural network via B_PoseNeuralNetwork for processing. Various machine learning models can be utilized based on resource availability and required accuracy, such as ML WebView or ML Epic models, with CPU or GPU options.

Broadcasting the neural network inference results occurs in step 208. The B_CapturePoseActor handles the broadcasting of pose estimation results after processing them through the neural network. The inference results, likely containing data on detected poses, are sent to all relevant components within the system, ensuring that every part of the system that needs to analyze or display the pose data receives it simultaneously.

Step 209 involves parsing and visualizing the pose data. The B_PoseParser takes the JSON formatted results from the neural network and parses them to extract actionable data. JSON parsing is critical as it converts data from a text format into a usable format within the software, allowing for further processing and analysis. The B_PoseDrawer then visualizes the data by drawing boxes and landmarks on the captured frames, providing clear and immediate visual feedback on the pose accuracy.

In step 210, comparison and adjustment based on pose predictions take place. The B_ComparePoseActor runs a current pose prediction comparison, assessing how closely the performer's current poses match expected poses.

This is essential for training and performance improvement. The B_ComparePoseActor also retrieves the index or position within the current session or performance timeline, helping to pinpoint the exact moment in the session for detailed analysis and review. Based on the index retrieved, the montage position is adjusted, and the timeline is updated, ensuring that the analysis and feedback are synced accurately with the performance timeline.

Finally, step 211 involves continuous comparative analysis. The system continuously compares the current performance with historical data and adjusts for environmental variables (like changes in the camera setup, lighting, or space). This holistic approach enhances the learning curve and performance accuracy by incorporating real-time data and past performance insights.

Figure 3:
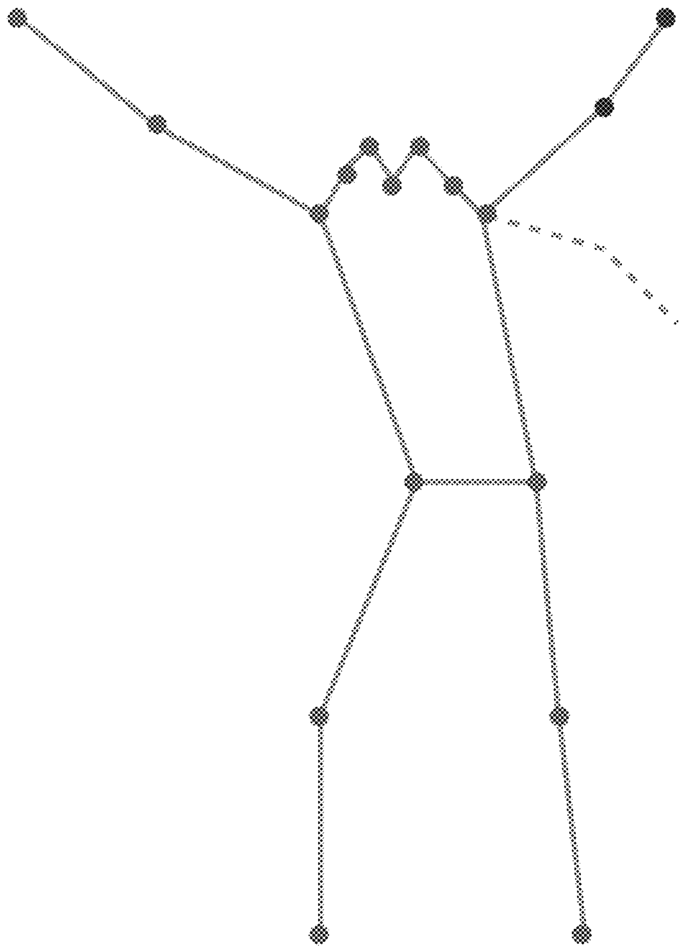
FIG. 3 illustrates an example of the present invention rendering joint colors based on comparison results, indicating a bad position.

FIG. 3 illustrates an example of the present invention rendering joint colors based on comparison results, indicating a bad position. In this embodiment, the user's pose is captured and compared to the pre-recorded instructor's movements. The B_ComparePoseActor analyzes the comparison results and determines that the user's position deviates significantly from the expected pose. Consequently, the B_PoseDrawer component renders the color of the joints as red, providing clear visual feedback to the user that their current position is incorrect and requires adjustment. The red color serves as an indication that the user's pose does not match the instructor's movements and needs to be corrected to achieve the desired performance.

Figure 4:
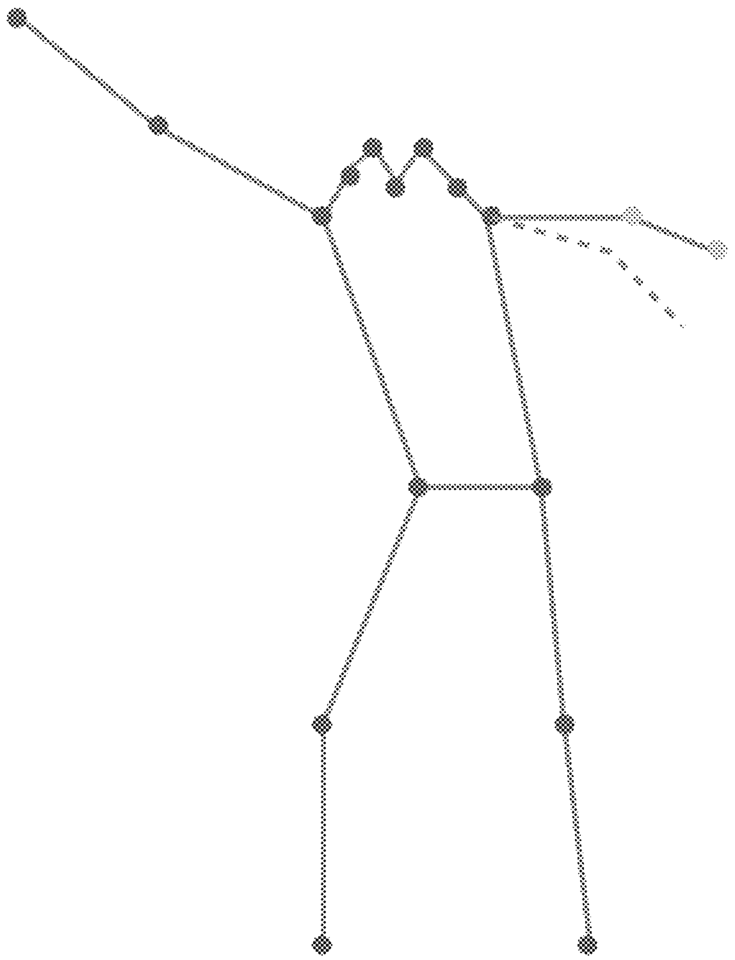
FIG. 4 depicts an example of the present invention rendering joint colors based on comparison results, indicating a warning position.

FIG. 4 depicts an example of the present invention rendering joint colors based on comparison results, indicating a warning position. In this scenario, the user's pose is captured and compared to the pre-recorded instructor's movements. The B_ComparePoseActor analyzes the comparison results and determines that the user's position is close to the expected pose but still requires minor adjustments. As a result, the B_PoseDrawer component renders the color of the joints as yellow, providing visual feedback to the user that their current position is nearly correct but needs some refinement. The yellow color serves as a cautionary indication that the user's pose is close to the desired position but requires further modification to achieve optimal alignment with the instructor's movements.

Figure 5:
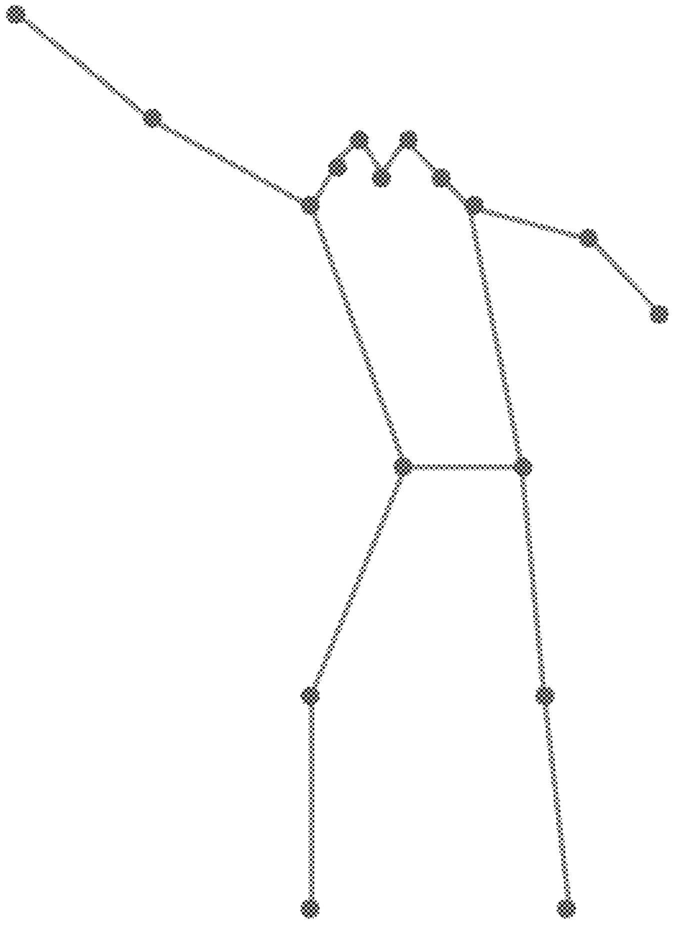
FIG. 5 shows an example of the present invention rendering joint colors based on comparison results, indicating a coincidence position.

FIG. 5 shows an example of the present invention rendering joint colors based on comparison results, indicating a coincidence position. In this case, the user's pose is captured and compared to the pre-recorded instructor's movements. The B_ComparePoseActor analyzes the comparison results and determines that the user's position closely matches the expected pose. Consequently, the B_PoseDrawer component renders the color of the joints as green, providing positive visual feedback to the user that their current position is correct and aligns well with the instructor's movements. The green color serves as a clear indication that the user's pose is accurate and coincides with the desired performance, encouraging the user to maintain the correct position and continue with the exercise or dance routine.

Figure 6:
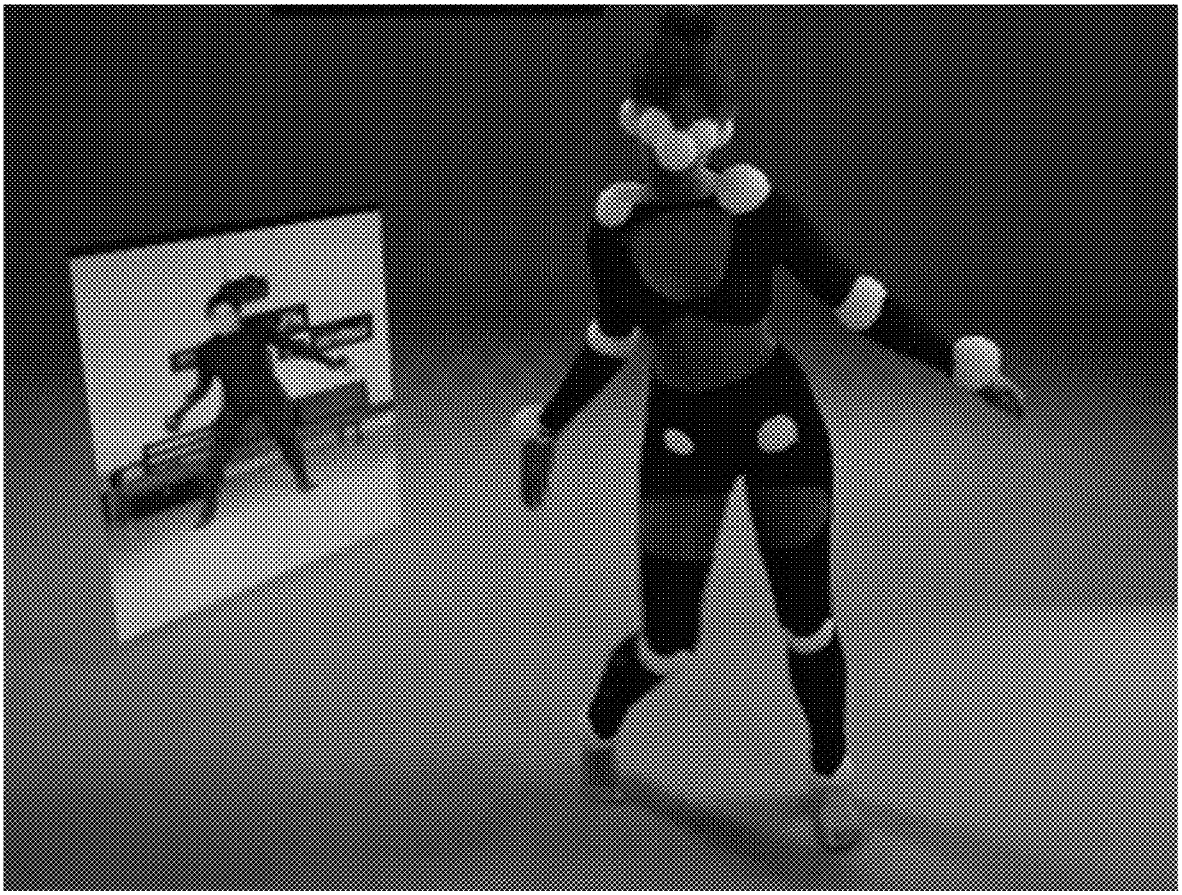
FIG. 6 illustrates an embodiment of a hyper-realistic avatar available to the user, which aids in the visualization of movement guidance.

FIG. 6 illustrates an embodiment of a hyper-realistic avatar available to the user, which aids in the visualization of movement guidance. The avatar is a digital representation of the instructor, created using advanced motion capture techniques and imported into a state-of-the-art game engine environment. The avatar is designed to closely mimic the appearance and movements of the instructor, providing a highly immersive and personalized learning experience for the user.

The avatar is depicted in a neutral stance, with its arms slightly bent at the elbows and its legs shoulder-width apart. The avatar's facial features, hair, and clothing are meticulously detailed to resemble those of the instructor, enhancing the realism of the digital representation. The avatar's body proportions and musculature are accurately modeled based on the instructor's physique, ensuring that the movements and poses demonstrated by the avatar closely match those of the instructor. By leveraging the hyper-realistic avatar, the present invention offers a highly engaging and effective means of delivering personalized, automated feedback and instruction to users.

The embodiments described herein are given for the purpose of facilitating the understanding of the present invention and are not intended to limit the interpretation of the present invention. The respective elements and their arrangements, materials, conditions, shapes, sizes, or the like of the embodiment are not limited to the illustrated examples but may be appropriately changed. Further, the constituents described in the embodiment may be partially replaced or combined.

Although specific embodiments have been illustrated and described herein for purposes of description of the preferred embodiment, it will be appreciated by those of ordinary skill in the art that a wide variety of alternate and/or equivalent implementations may be substituted for the specific embodiment shown and described without departing from the scope of the present invention. Those with skill in the chemical, mechanical, electromechanical, electrical, and computer arts will readily appreciate that the present invention may be implemented in a wide variety of embodiments. This application is intended to cover any adaptations or variations of the preferred embodiments discussed herein. Therefore, it is manifestly intended that this invention be limited only by the claims and the equivalents thereof. It should be appreciated and understood that the present invention may be embodied as systems, methods, apparatus, computer readable media, non-transitory computer readable media and/or computer program products.

The present invention may take the form of an entirely hardware embodiment. an entirely software embodiment (including firmware, resident software, micro-code, etc.) or an embodiment combining software and hardware aspects that may all generally be referred to herein as a "circuit." "module" or "system." The present invention may take the form of a computer program product embodied in one or more computer readable mediums) having computer readable program code embodied thereon.

One or more computer readable medium(s) may be utilized. alone or in combination. The computer readable medium may be a computer readable storage medium or a computer readable signal medium. A suitable computer readable storage medium may be, for example, but not limited to, an electronic, magnetic, optical, electromagnetic, infrared. or semiconductor system, apparatus, or device, or any suitable combination of the foregoing. Other examples of suitable computer readable storage medium include, without limitation, the following: an electrical connection having one or more wires, a portable computer diskette, a hard disk, a random access memory (RAM), a read-only memory (ROM), an erasable programmable read only memory (EPROM or flash memory). an optical fiber. an optical storage device, a magnetic storage device, or any suitable combination of the foregoing. A suitable computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Python, C++ or the like and conventional procedural programming languages, such as the "C" programming language or similar programming languages. The program code may execute entirely on the user's computing device (such as, a computer), partly on the user's computing device, as a stand-alone software package, partly on the user's computing device and partly on a remote computing device or entirely on the remote computing device or server. In the latter scenario, the remote computing device may be connected to the user's computing device through any type of network, including a local area network (LAN) or a wide area network (WAN), or the connection may be made to an external computing device (for example, through the Internet using an Internet Service Provider).

The present invention is described herein with reference to flowchart illustrations and/or block diagrams, can be implemented by computer program instructions. These computer program instructions may be provided to a processor of a general purpose computing device (such as, a computer), special purpose computing device, or other programmable data processing apparatus to produce a machine, such that the instructions, which execute via the processor of the computing device or other programmable data processing apparatus, create means for implementing the functions/acts specified in the flowchart and/or block diagram block or blocks.

These computer program instructions may also be stored in a computer readable medium that can direct a computing device, other programmable data processing apparatus, o rother devices to function in a particular manner, such that the instructions stored in the computer read-able medium produce an article of manufacture including instructions which implement the function/act specified in the flowchart and/or block diagram block or blocks.

The computer program instructions may also be loaded onto a computing device, other programmable data processing apparatus, or other devices to cause a series of operational steps to be performed on the computing device, other programmable apparatus or other devices to produce a computer implemented process such that the instructions which execute on the computing device o rother programmable apparatus provide processes for implementing the functions/acts specified in the flow chart and/or block diagram block or blocks.

It should be appreciated that the function blocks or modules shown in the drawings illustrate the architecture, functionality, and operation of possible implementations of systems, methods and computer program media and/or products according to various embodiments of the present invention. In this regard, each block in the drawings may represent a module, segment, or portion of code, which comprises one or more executable instructions for implementing the specified logical function(s). It should also be noted that, in some alternative implementations, the functions noted in the block may occur out of the order noted in the figures. For example, the function of two blocks shown in succession may, in fact, be executed substantially concurrently, or the blocks may sometimes be executed in the reverse order, depending upon the functionality involved.

It will also be noted that each block and combinations of blocks in any one of the drawings can be implemented by special purpose hardware-based systems that perform the specified functions or acts, or combinations of special purpose hardware and computer instructions. Also, although communication between function blocks or modules may be indicated in one direction on the drawings, such communication may also be in both directions.

What is claimed is:

1. A system for providing automated feedback on user movements compared to pre-recorded instructor movements, the system comprising:

a motion capture system configured to record movements of an instructor and generate three-dimensional (3D) motion capture data;

a computing device comprising a processor and a memory, the memory storing instructions that, when executed by the processor, cause the computing device to:

receive the 3D motion capture data of the instructor movements;

assign the 3D motion capture data to a hyper-realistic avatar of the instructor;

preprocess the 3D motion capture data to generate a plurality of artificial intelligence (AI) predictions from different angles and room conditions;

a user device comprising a camera, a display, and an application, wherein the application is configured to:

capture a camera feed of a user performing movements;

identify, in real-time, a skeletal frame of the user from the camera feed;

compare the user's skeletal frame to the instructor's preprocessed AI predictions using a neural network to determine if the user's movements match the instructor's movements;

display, on the user device, the user's skeletal frame compared to the instructor's movements;

generate, based on the comparison, real-time feedback to the user via voice commands, indicating when the user's movements are out of sync or position compared to the instructor's movements; and provide, at an end of a session, analytics on the user's performance compared to the instructor's movements, wherein the motion capture system comprises at least one of an optical motion capture system, an inertial motion capture system, or a marker less motion capture system, wherein:

the optical motion capture system utilizes reflective markers worn by the instructor and a plurality of cameras configured to track positions of the reflective markers;

the inertial motion capture system utilizes a plurality of inertial measurement units worn by the instructor and configured to track the instructor's movements; and the marker less motion capture system utilizes a plurality of depth sensing cameras configured to track the instructor's movements without the use of worn sensors or markers.

2. The system of claim 1, wherein the instructions, when executed by the processor, further cause the computing device to preprocess the 3D motion capture data to generate the plurality of AI predictions by:

rendering, using a game engine, the 3D motion capture data assigned to the instructor avatar from a plurality of virtual camera angles;

varying, in the game engine, virtual lighting and environment conditions;

capturing, from the game engine, a plurality of 2D frames of the instructor avatar performing the movements; and analyzing the plurality of 2D frames using one or more trained neural networks to generate the AI predictions.

3. The system of claim 1, wherein the neural network used to compare the user's skeletal frame to the instructor's preprocessed AI predictions is trained using a dataset comprising:

a plurality of 2D frames of the instructor avatar performing the movements from different angles and under different virtual environment conditions; and corresponding 3D motion capture data of the instructor's movements temporally aligned with the 2D frames.

4. The system of claim 1, wherein the application is further configured to generate the real-time feedback to the user by:

displaying, on the user device, a visual indicator for each tracked skeletal key point, wherein the visual indicator is configured to change color based on a calculated deviation between a position of the skeletal key point and a corresponding key point position in the instructor's preprocessed AI predictions.

5. The system of claim 1, wherein the analytics on the user's performance comprise at least one of:

a timeline of the user's skeletal frame positions compared to the instructor's movements;

a graph of calculated deviations for each skeletal keypoint over the session;

a score based on the user's overall accuracy in matching the instructor's movements; or recommendations for improvement based on the user's performance.

6. The system of claim 1, wherein the application is further configured to:

transmit the user's performance data to a remote server, wherein the remote server is configured to compare the user's performance data to performance data of a plurality of other users; and display a leaderboard showing the user's performance ranking among the plurality of other users.

7. The system of claim 1, further comprising:

an audio capture system configured to record the instructor's voice while recording the instructor's movements, wherein the instructions, when executed by the processor, further cause the computing device to:

synchronize the recorded audio with the 3D motion capture data; and play back the recorded audio in synchronization with the instructor avatar's animated movements in the application.

* * * * *